United States Patent [19]
Lunsford et al.

[11] Patent Number: 5,590,363
[45] Date of Patent: Dec. 31, 1996

[54] CIRCUIT FOR DETECTION OF CO-PROCESSOR UNIT PRESENCE AND FOR CORRECTION OF ITS ABSENCE

[75] Inventors: David R. Lunsford; Michael D. Durkin, both of Austin, Tex.

[73] Assignee: Dell USA, L.P., Austin, Tex.

[21] Appl. No.: 387,658

[22] Filed: May 14, 1993

Related U.S. Application Data

[63] Continuation of Ser. No. 750,442, Aug. 20, 1991, abandoned, which is a continuation of Ser. No. 339,690, Apr. 18, 1989, abandoned.

[51] Int. Cl.$^6$ .................................................. C06F 15/16
[52] U.S. Cl. .................. 395/800; 364/228.6; 364/229.2; 364/280.2; 364/931.49
[58] Field of Search ............................ 395/700, 200, 395/800; 364/228.6

[56] References Cited

U.S. PATENT DOCUMENTS

| | | | |
|---|---|---|---|
| 4,547,849 | 10/1985 | Louie et al. | 364/200 |
| 4,556,953 | 12/1985 | Caprio et al. | 364/900 |
| 4,598,356 | 7/1986 | Dean et al. | 364/200 |
| 4,679,166 | 7/1987 | Berger et al. | 364/900 |
| 4,695,945 | 9/1987 | Irwin | 364/200 |
| 4,715,013 | 12/1987 | MacGregor et al. | 364/900 |
| 4,926,318 | 5/1990 | Nakayama | 364/200 |
| 4,964,038 | 10/1990 | Louis et al. | 364/200 |
| 4,979,102 | 12/1990 | Tokuume | 364/200 |

OTHER PUBLICATIONS

Short, Kenneth L. "Microprocessors and Programmed Logic", 2nd edition, ©1987, 1981. Prentice Hall, Inc. QA 76.5, s496. ISBN 0-13-580606-2 025.
LAPX 286 Hardware Reference Manual, Intel Corporation, 1983 pp. 6.1–6.8.

*Primary Examiner*—Kevin A. Kriess
*Assistant Examiner*—Lucien Toplu
*Attorney, Agent, or Firm*—Michelle M. Turner; Henry N. Garrana; Mark P. Kahler

[57] ABSTRACT

A digital computer system includes a central processor unit (CPU) and an optional co-processor unit, both connected to a local bus. The co-processor unit, when installed, fits into a socket having pins, the pins being connected to communicate with the CPU through the local bus. A presence-detect circuit is connected to the local bus and receives a signal indicating the presence of the co-processor unit in the socket. Logic circuitry receives the output signal from the presence-detect circuit and provides a READY— signal in either the presence or absence of the co-processor unit.

5 Claims, 5 Drawing Sheets

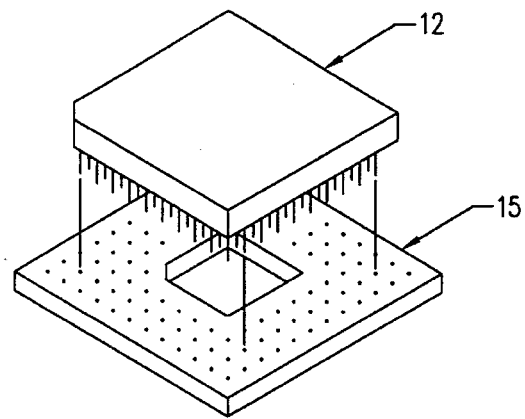
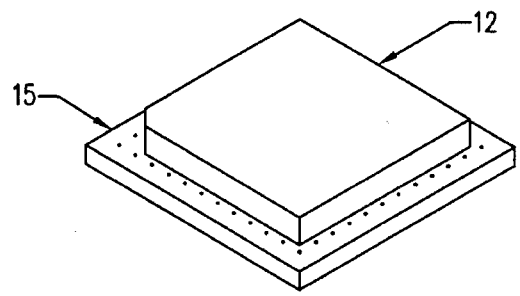
FIG. 4a
FIG. 4b
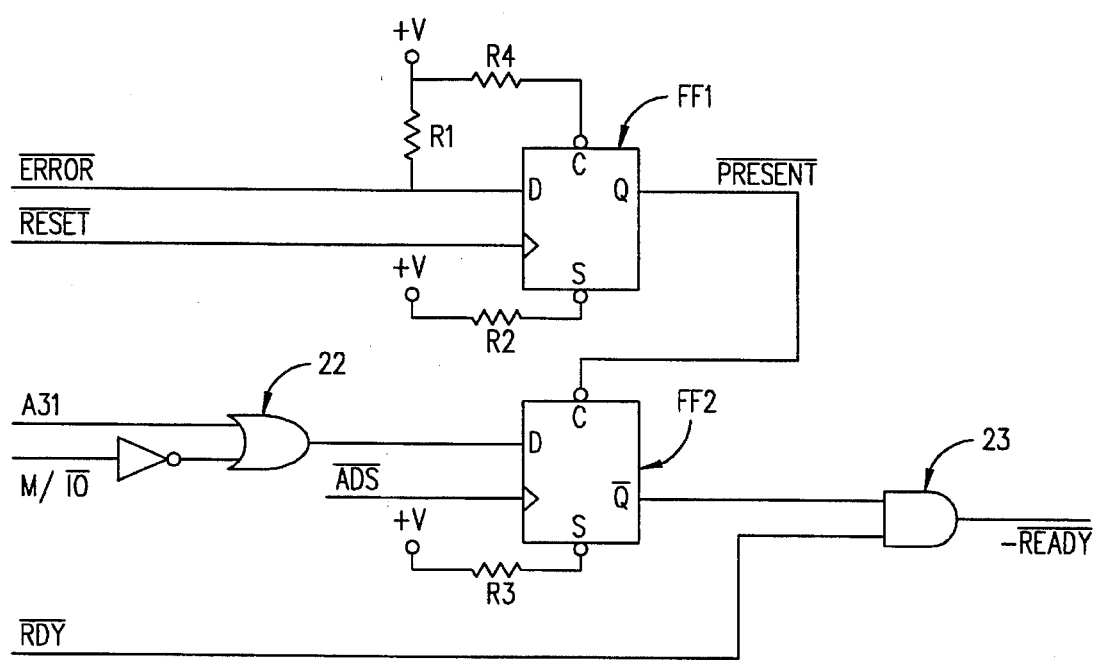
FIG. 5

PRESENCE DETECT CIRCUIT

LOGIC CIRCUITRY

CIRCUIT FOR DETECTION OF CO-PROCESSOR UNIT PRESENCE AND FOR CORRECTION OF ITS ABSENCE

This application is a Continuation of application Ser. No. 07/750,442, filed Aug. 20, 1991 which is a Continuation of application Ser. No. 07/339,690, filed Apr. 18, 1989, both now abandoned.

BACKGROUND OF THE INVENTION

1. Field of the Invention

This invention relates to digital computer systems having a CPU and an optional co-processor unit. More particularly, it relates to those systems wherein the presence or absence of the optional co-processor unit is detected and correction is made for its absence.

2. Description of the Prior Art

In prior art systems, the presence or absence of the optional co-processor was taken care of by the user setting or removing a jumper or setting or re-setting a Dual In-Line Package (DIP) switch. The obvious problem with this prior art system is that the user had to understand how to set the jumper or DIP switch and to remember to take the necessary action.

The present invention solves this problem by automatically detecting the presence or absence of the co-processor unit and automatically adjusting the circuitry that in the prior art was adjusted and configured by the physical act as noted above.

BRIEF SUMMARY OF THE INVENTION

A digital computer system includes a CPU and may include an optional co-processor unit. The co-processor unit and the CPU are connected to a local bus and bilaterally communicate therethrough. The additional co-processor unit fits into a socket equipped with pins which are connected to the local bus. A presence-detect circuit checks whether or not a co-processor unit has been installed in the socket. If it has been installed, a signal from the co-processor unit at a first voltage level is sent through a pin to the presence-detect circuit, and the computer system, on start-up, sends out a RESET— signal. If there is no co-processor unit present in the socket, then a second voltage level will be present, indicating absence of a co-processor unit.

Logic circuitry receives the output of the presence-detect circuit with the presence of a co-processor unit being signified by the output at the first voltage level, and the absence of the co-processor being signified by an output at the second voltage level. The purpose of the logic circuitry is to provide a READY— signal even though there is no co-processor unit in place. The reason for this is that, otherwise, the computer system will become inoperative when the CPU attempts to address an absent co-processor unit.

If a co-processor unit is present, then the co-processor itself generates an RDY— signal at the first voltage level providing a READY— signal. If the co-processor unit is absent, then the logic circuitry provides a READY— signal which is generated by the logic circuitry.

The primary object of this invention is to provide a computer system having a CPU and an optional co-processor unit wherein the system can detect the presence or absence of the co-processor and generate a READY— signal in the absence of the co-processor unit and receive a READY— signal from the co-processor unit when it is present.

This and other objects will be made evident in the detailed description that follows:

BRIEF DESCRIPTION OF THE DRAWINGS

FIG. 4a is a perspective view of the co-processor unit ready for insertion into the socket.

FIG. 4b illustrates the co-processor in place in the socket.

FIG. 5 is a schematic diagram of the presence-detect circuit and the logic circuitry of this invention.

DETAILED DESCRIPTION OF THE INVENTION

The problem solved by this invention is providing a READY— signal from an optional co-processor unit in a computer system when addressed by the CPU, whether or not the co-processor is present. A presence-detect circuit detects whether or not the co-processor unit is present and, if not, signifies that fact to logic circuitry which creates a READY— signal when the CPU interrogates the absent co-processor unit. If a co-processor unit is present, it generates and provides its own READY— signal in response to being addressed by the CPU. If a READY— signal were not generated through the combination of the presence-detect circuit and the logic circuitry, then the system would become inoperative.

The solution of the problem is set out in detail in the description that follows.

Figure 1:
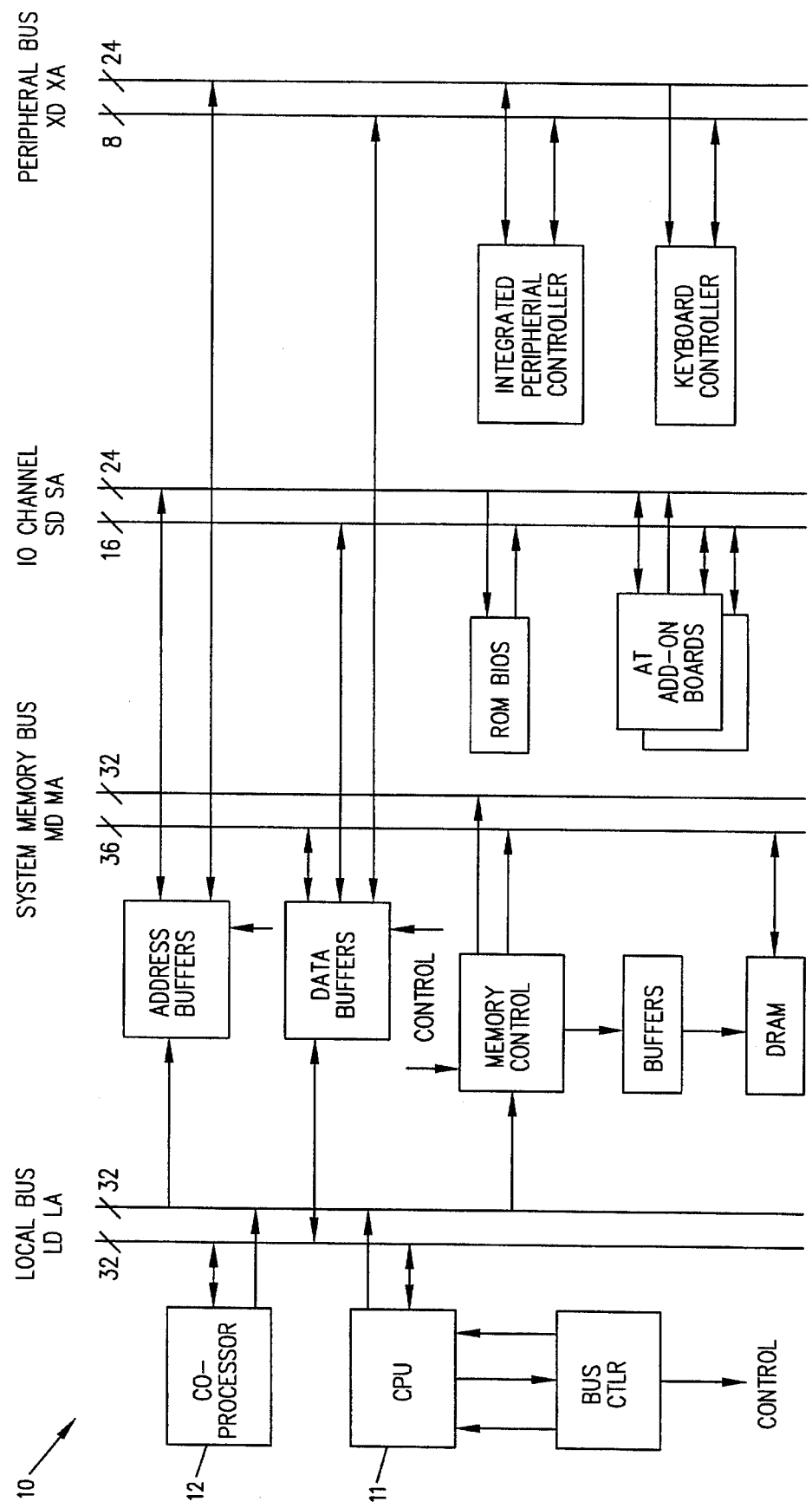
FIG. 1 is a block diagram of the computer system of this invention.

FIG. 1 is a block diagram of computer system 10, illustrating CPU 11 and optional co-processor 12 being bilaterally connected to the local bus. Other components in the system are not pertinent to understanding this invention and will not be described herein.

Figure 2:
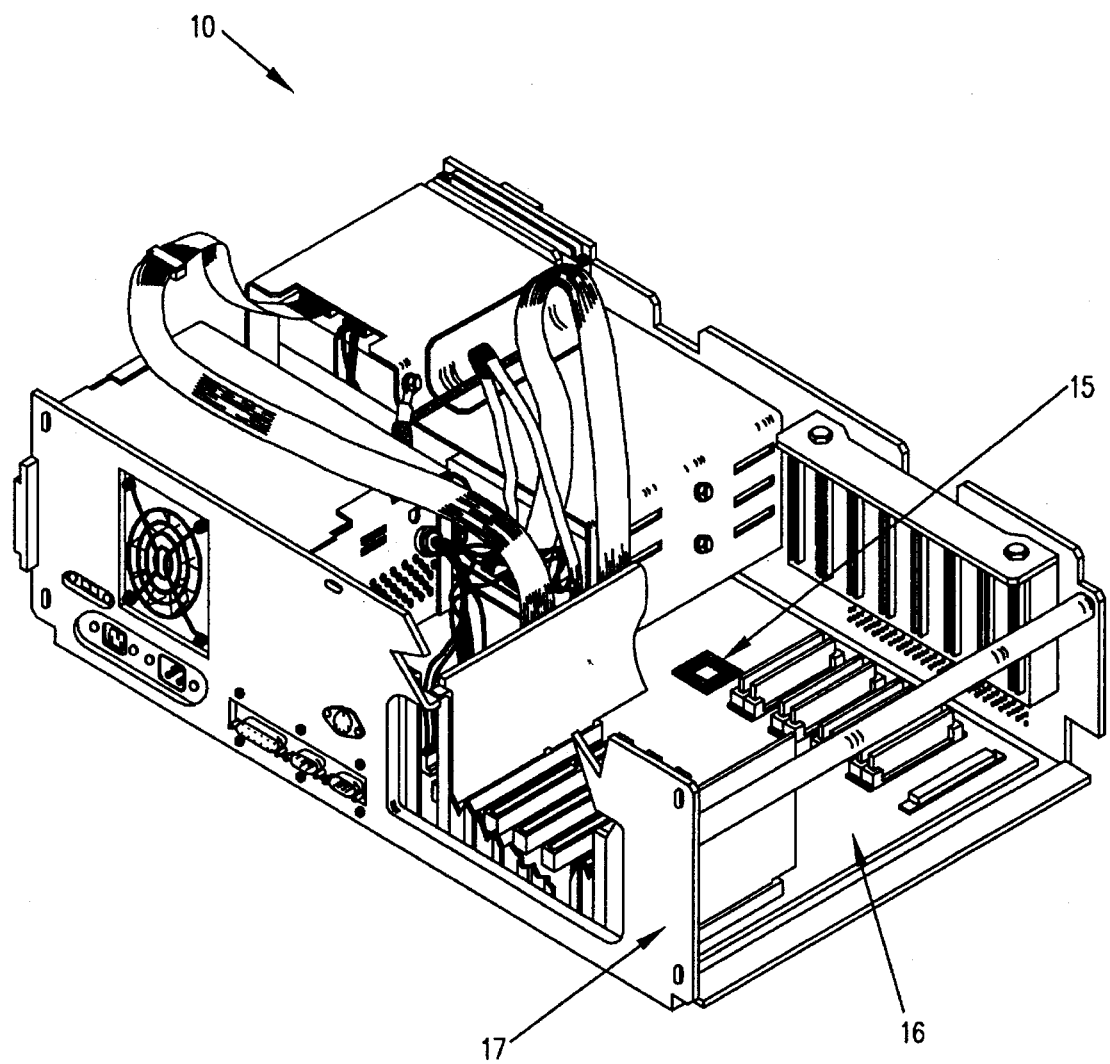
FIG. 2 is a partial cut-away perspective view of the inner portion of a digital computer system.

FIG. 2 is a cut-away perspective view of the interior section of digital computer system 10. Inside chassis 17 is main logic board 16 to which is attached socket 15. Socket 15 receives co-processor 12.

Figure 3:
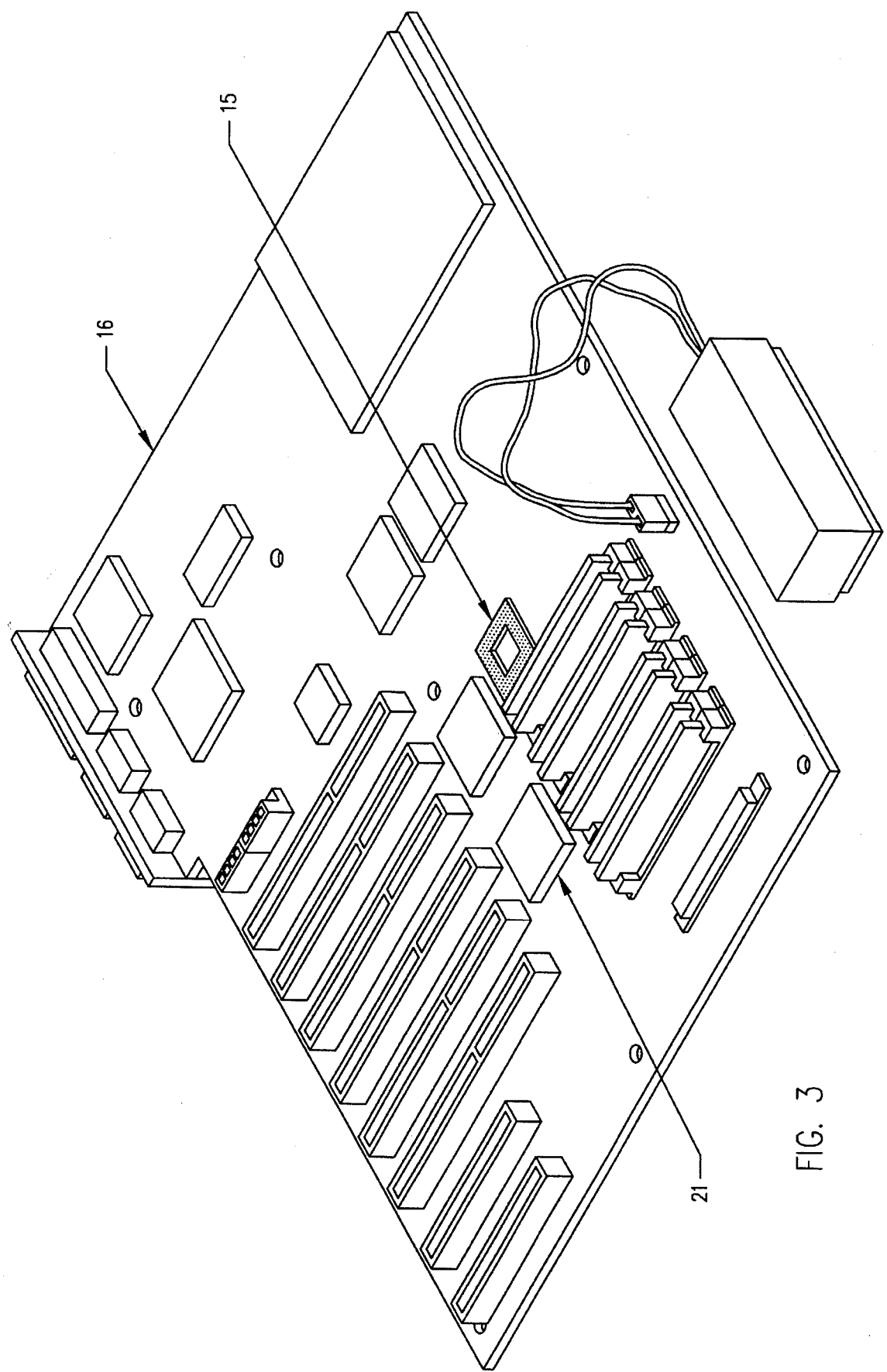
FIG. 3 is a perspective drawing of the main circuit board and mounted components of this invention.

FIG. 3 is a perspective drawing of the main circuit board 16 showing CPU 21 in place and socket 15 in place.

FIG. 4a illustrates co-processor unit 12 ready for insertion into socket 15.

FIG. 4b illustrates co-processor unit 12 in place in socket 15.

FIG. 5 is a schematic diagram of the presence-detect circuit and the logic circuitry. It should be pointed out that the names of the signals described herein are completely arbitrary and in no way limiting to the practice of this invention.

Flip-flop FF1 is shown with its clear and set inputs attached to +V through resistors R4 and R2, respectively, thus assuring that neither the clear nor the set input will be used to clear or set flip-flop FF1. ERROR— signal from socket 15 is applied to the D input of flip-flop FF1. The RESET— signal, originally from CPU 11, is applied to the appropriate pin of socket 15 which then sends it to clock flip-flop FF1. The Q output of flip-flop FF1 provides a clear input to flip-flop FF2. Signals A31 and M/IO— (inverted) are shown as inputs to OR gate 22 which is connected to the D input of flip-flop FF2. The clock input of flip-flop FF2 is provided by signal ADS— (from CPU 11) and is an address strobe signal. Signal RDY— from co-processor unit 12, is supplied as an input to AND gate 23 (which has another input applied from the Q— output of FF2), providing the READY— signal output.

MODE OF OPERATION OF THE INVENTION

In this preferred embodiment, it should be noted that a "first voltage" as used in this description applies to a low voltage and that a "second voltage" applies to a high voltage. Reverse logic could, of course, be used.

Upon start-up of digital computer system 10, a reset circuit (not shown) sends out a RESET— signal which resets various components, including the co-processor unit, if present, through a pin on socket 15. If co-processor unit 12 is present, then the ERROR— signal goes low clearing flip-flop 1 when the RESET— signal goes high. When the PRESENT— signal from terminal Q of flip-flop 1 is low, clearing flip-flop FF2, then output Q— from FF2 is high and flip-flop FF2 is effectively out of the circuit. RDY— signal generated by the co-processor unit 12 goes low and thereby generates the READY— signal.

When co-processor unit 12 is absent, then ERROR— signal remains high and sets flip-flop FF1 by causing its Q output, PRESENT— signal to be high which then disables the clear input to flip-flop FF2. Signals A31 and M/IO—, the address information, are applied to the D input of flip-flop FF2, setting that flip-flop to the high state as clocking signal ADS— from the CPU 11 goes positive. When the Q— output from flip-flop FF2 goes low, a READY— signal is generated and sent out AND gate 23.

Figure 6:
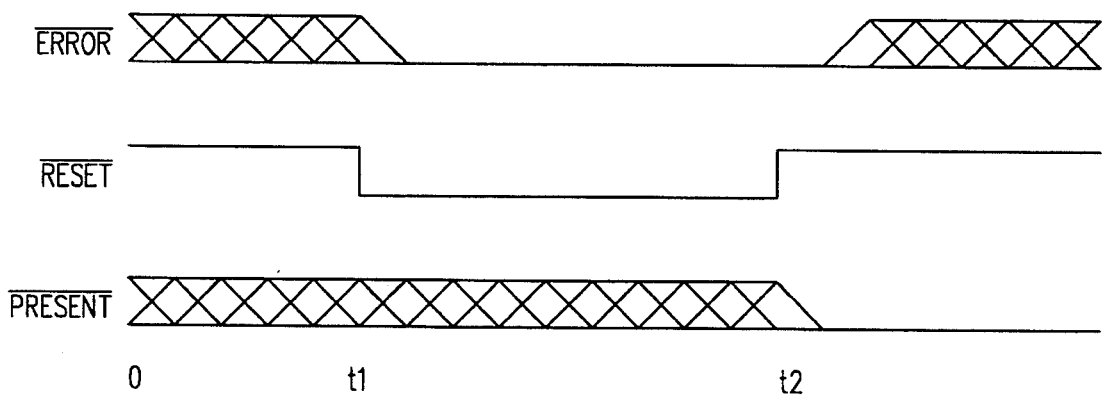
FIG. 6 illustrates timing diagrams for the presence-detect circuit and for the logic circuitry.
Figure 6:
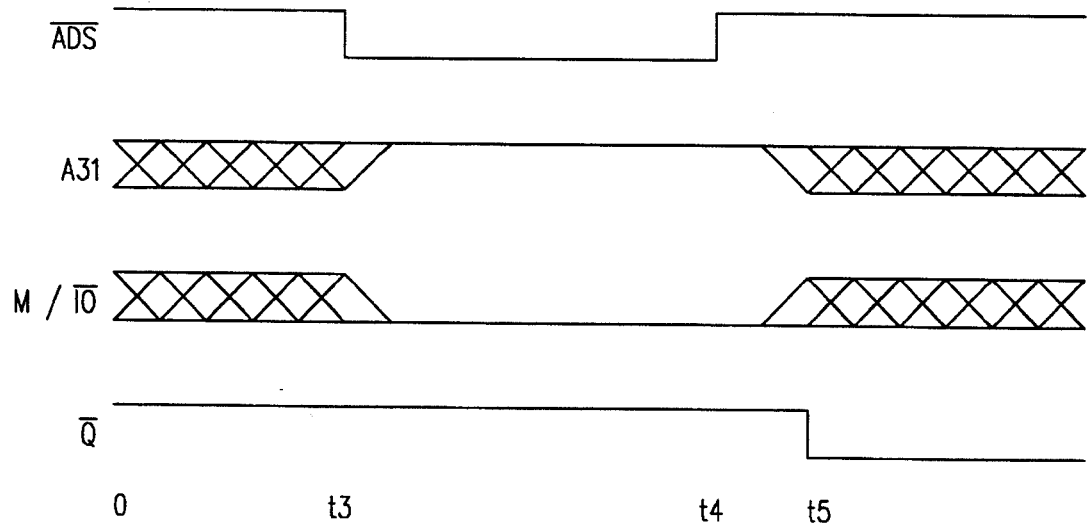

FIG. 6 illustrates timing in the presence-detect circuit and the logic circuitry. The RESET— signal is shown going from high to low at time $t_1$. At time $t_1$, the ERROR— signal goes low, indicating the presence of co-processor unit 12. At time $t_2$, RESET— signal goes high, causing flip-flop FF1 to be set to the low state and the PRESENT— signal to go low at that time.

In the logic circuitry, the ADS— signal from CPU 11 is shown going from high to low at time $t_3$, causing address circuitry A31 to go high and M/IO— to go low (before inversion). At time $t_4$, the ADS— signal goes high causing Q— to go low.

In the case shown for the presence-detect circuit, co-processor unit 12 is present. In the logic circuitry description, co-processor unit 12 is absent.

Those skilled in the art may make changes in the specific logic and in the components, all without departing from the scope and spirit of this invention which is limited only by the appended claims.

The invention claimed is:

1. A personal computer system that generates a RESET— signal upon start-up to reset electronic components in the computer system, having a local bus, including a central processing unit (CPU), and an optional co-processor unit that is addressable by the CPU and that is capable of producing a RDY— signal subsequent to receiving the RESET— signal, comprising:

(a) a socket, having pins, for receiving the co-processor unit, the pins being connected to communicate with the CPU through the local bus and receiving the RESET— signal from the CPU and electrically connecting the RESET— signal to the optional co-processor unit;

(b) a presence detect circuit, electrically connected to the socket and receiving as inputs the RESET— signal and a signal indicative of whether the co-processor unit is mounted in the socket, for providing an output signal at a first voltage level when the co-processor unit is mounted in the socket, and at a second voltage level when the co-processor unit is not mounted in the socket; and (c) logic circuitry electrically connected to receive the output signal from the presence-detect circuit and the RDY— signal from the optional co-processor unit and, in response thereto, to provide a READY— signal at the first voltage level when the co-processor unit is mounted in the socket and when the co-processor unit is not mounted in the socket;

(d) wherein the presence detect circuit detects whether the optional co-processor unit is installed into the socket, and the logic circuitry produces a READY— signal, subsequent to the RESET— signal if the co-processor unit is installed into the socket, and if the co-processor unit is not installed into the socket.

2. The system of claim 1 wherein the RESET— signal is applied to the socket, and wherein the co-processor unit has means for responding to the RESET— signal by generating an ERROR— signal at the first voltage level.

3. A digital computer system that generates a RESET— signal upon startup to reset electronic components in the computer system, having a local bus, including a central processor unit (CPU), and an optional co-processor unit that is addressable by the CPU and that is capable of producing a RDY— signal subsequent to receiving the RESET— signal, comprising:

(a) a socket, having pins, for receiving the co-processor unit, the pins being connected to communicate with the CPU through the local bus, wherein the RESET— signal is applied to the socket, and wherein the co-processor unit has means for responding to the RESET— signal by generating a RDY— signal at the first voltage level;

(b) a presence-detect circuit, electrically connected to the socket and receiving as inputs the RESET— signal and a signal indicative of whether the co-processor unit is mounted in the socket for providing an output signal at a first voltage level when the co-processor unit is mounted in the socket, and at a second voltage level when the co-processor unit is not mounted in the socket, the presence-detect circuit comprising a first flip-flop having a first input for receiving an ERROR— signal and a second input for receiving the RESET— signal, to set the first flip-flop to the first voltage level when the co-processor unit is mounted in the socket, and to the second voltage level when the co-processor unit is not mounted in the socket, the first flip-flop having an output for providing a PRESENT— signal that is at the first voltage level when the co-processor unit is mounted in the socket and at the second voltage level when the co-processor unit is not mounted in the socket; and (c) logic circuitry electrically connected to receive the output signal from the presence-detect circuit and the RDY— signal from the optional co-processor unit, and in response thereto, to provide a READY— signal at the first voltage level when either the co-processor unit is mounted or not mounted in the socket;

(d) wherein the presence detect circuit detects whether the optional co-processor unit is installed into the socket, and the logic circuitry produces a READY— signal, subsequent to the RESET— signal if the co-processor unit is installed into the socket, and if the co-processor unit is not installed into the socket.

4. The system of claim 3, wherein the logic circuitry comprises:

(c)
- (i) a second flip-flop having a clear input for receiving the PRESENT— signal for clearing and maintaining the second flip-flop at the first voltage level when the co-processor unit is mounted within the socket, a first input for receiving an address signal from the CPU, and a second input for receiving an ADS— signal to set the second flip-flop to the second voltage level when the co-processor unit is not mounted within the socket; and
- (ii) an AND gate for receiving an inverted output from the second flip-flop and the RDY— signal from the co-processor unit to provide a READY— signal output when the second flip-flop is set to the second voltage level, or when the RDY— signal from the co-processor unit is at the first level. co-processor unit is mounted in the socket, and driving the READY— signal in response to and logically following the ADS— signal when the co-processor unit is not mounted in the sockets wherein the logic circuitry comprises:
- (i) a second flip-flop having a clear input for receiving the PRESENT— signal for clearing and maintaining the second flip-flop at the first voltage level when the co-processor unit is mounted within the socket, a first input for receiving an address signal from the CPU, and a second input for receiving the ADS— signal to set the second flip-flop to the second voltage level when the co-processor unit is not mounted within the socket; and
- (ii) an AND gate for receiving an inverted output from the second flip-flop and the RDY— signal from the co-processor unit to provide a READY— signal output when the second flip-flop is set to the second voltage level, or when the RDY— signal from the co-processor unit is at the first level.

5. A personal computer system having a local bus, a central processor unit (CPU) for producing a first signal, and an optional co-processor unit that is addressable by the CPU and that is capable of producing a second signal, the system comprising:

(a) a socket, having pins, for receiving the co-processor unit, the pins being connected to communicate with the CPU through the local bus;

(b) a presence-detect circuit receiving a signal indicative of whether the co-processor unit is mounted in the socket, and providing an output signal at a first voltage level when the co-processor unit is mounted in the socket, and at a second voltage level when the co-processor unit is not mounted in the socket; and (c) a logic circuit capable of receiving the output signal from the presence-detect circuit, the first signal from the CPU, and the second signal from the optional co-processor unit and providing a third signal that is responsive to the second signal if the co-processor unit is installed into the socket and responsive to the first signal if the co-processor unit is not installed into the socket.

\* \* \* \* \*